(12) United States Patent
Ezawa

(10) Patent No.: US 10,026,240 B2
(45) Date of Patent: Jul. 17, 2018

(54) ABNORMALITY DIAGNOSTIC DEVICE AND METHOD THEREFOR

(71) Applicant: KABUSHIKI KAISHA TOSHIBA, Tokyo (JP)

(72) Inventor: Toru Ezawa, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 15/263,953

(22) Filed: Sep. 13, 2016

(65) Prior Publication Data

US 2017/0178426 A1 Jun. 22, 2017

(30) Foreign Application Priority Data

Dec. 17, 2015 (JP) ................................ 2015-246483

(51) Int. Cl.
| | | |
|---|---|---|
| *G07C 5/08* | (2006.01) | |
| *B61K 9/00* | (2006.01) | |
| *B61L 27/00* | (2006.01) | |
| *G06N 99/00* | (2010.01) | |
| *B61L 15/00* | (2006.01) | |
| *B61L 25/02* | (2006.01) | |
| *B61L 25/04* | (2006.01) | |

(52) U.S. Cl.
CPC ............. *G07C 5/0808* (2013.01); *B61K 9/00* (2013.01); *B61L 15/0081* (2013.01); *B61L 27/0038* (2013.01); *B61L 27/0055* (2013.01); *B61L 27/0094* (2013.01); *G06N 99/005* (2013.01); *B61L 25/021* (2013.01); *B61L 25/025* (2013.01); *B61L 25/04* (2013.01)

(58) Field of Classification Search
CPC .............. G07C 5/0808; B61L 27/0038; B61L 15/0081; B61L 27/0094; B61L 27/0055; B61L 25/04; B61L 25/025; B61L 25/021; G06N 99/005; B61K 9/00
See application file for complete search history.

(56) References Cited

U.S. PATENT DOCUMENTS

| | | | |
|---|---|---|---|
| 2012/0166142 A1 | 6/2012 | Maeda et al. | |
| 2013/0006540 A1* | 1/2013 | Sakaguchi | G01H 1/003 |
| | | | 702/34 |

FOREIGN PATENT DOCUMENTS

| | | |
|---|---|---|
| JP | 9-100910 | 4/1997 |
| JP | 2011-59790 | 3/2011 |
| JP | 2012-205332 | 10/2012 |
| JP | 2013-100111 | 5/2013 |
| JP | 2013-139205 | 7/2013 |
| JP | 2013-253847 | 12/2013 |
| JP | 2013253847 A * | 12/2013 |

* cited by examiner

*Primary Examiner* — Rodney A Butler
(74) *Attorney, Agent, or Firm* — Finnegan, Henderson, Farabow, Garrett & Dunner, L.L.P.

(57) ABSTRACT

According to one embodiment, an abnormality diagnostic device includes processing circuitry. The processing circuitry learns, based on a model generated from sensor data of a diagnostic object in a railroad vehicle, a data selection condition for selecting the sensor data utilized to diagnose the diagnostic object. The processing circuitry diagnoses abnormality of the diagnostic object based on the sensor data satisfying the data selection condition and a diagnostic model representing a relation between the sensor data and the abnormality of the diagnostic object.

10 Claims, 15 Drawing Sheets

| DATE AND TIME | TRAIN NUMBER | POSITION | VEHICLE OCCUPANCY | SPEED | BRAKE NOTCH | POWER NOTCH | REGENERATION AMOUNT | OVERHEAD WIRE VOLTAGE | ... |
|---|---|---|---|---|---|---|---|---|---|
| | | | | | | | | | |
| | | | | | | | | | |
| | | | | | | | | | |
| | | | | | | | | | |

VEHICLE DATA

FIG. 2

| DIAGNOSTIC OBJECT | OVERHEAD WIRE VOLTAGE ▽ | |
|---|---|---|
| LEARNING ITEM | LEARNING PROPRIETY | LEARNING GRANULARITY |
| POSITION | ○ | 1 |
| TIME PERIOD | ○ | 2 |
| VEHICLE OCCUPANCY | × | — |
| WEATHER | × | — |

LEARNING OBJECT SETTER

FIG. 3

| | SETTING VALUE |
|---|---|
| DETERMINATION COEFFICIENT | 0.8 |

LEARNING CONDITION SETTER

FIG. 4

SECTION

| | STATION A→STATION B | STATION B→STATION C | STATION C→STATION D | STATION D→STATION E | STATION E→STATION F |
|---|---|---|---|---|---|
| UTILIZED | ○ | ○ | | ○ | |
| NOT UTILIZED | | | ○ | | ○ |

TIME PERIOD

| | 5:00-7:00 | 7:00-9:00 | 9:00-11:00 | 11:00-13:00 | 13:00-15:00 |
|---|---|---|---|---|---|
| UTILIZED | ○ | | ○ | ○ | ○ |
| NOT UTILIZED | | ○ | | | |

SELECTION CONDITION

| SELECTION CONDITION SETTING SCREEN | | | | | |
|---|---|---|---|---|---|
| SECTION | | | | | |
| | STATION A→STATION B | STATION B→STATION C | STATION C→STATION D | STATION D→STATION E | STATION E→STATION F |
| UTILIZED | ○ | ○ | | ○ | |
| NOT UTILIZED | | | ○ | | ○ |

| TIME PERIOD | | | | | |
|---|---|---|---|---|---|
| | 5:00–6:00 | 6:00–7:00 | 7:00–8:00 | 9:00–10:00 | 10:00–11:00 |
| UTILIZED | ○ | | | ○ | ○ |
| NOT UTILIZED | | ○ | ○ | | |

| | STATION A→STATION B | STATION B→STATION C | STATION C→STATION D | STATION D→STATION E | STATION E→STATION F |
|---|---|---|---|---|---|
| UTILIZED | ○ | ○ | | ○ | |
| NOT UTILIZED | | | ○ | | ○ |
| DIAGNOSTIC RESULT | ABNORMALITY | NORMALITY | — | NORMALITY | — |
| COMPREHENSIVE DIAGNOSTIC RESULT | ABNORMALITY | | | | |

FIG. 10

|  | STATION A→STATION B | STATION B→STATION C | STATION C→STATION D | STATION D→STATION E | STATION E→STATION F |
|---|---|---|---|---|---|
| UTILIZED | ○ | ○ |  | ○ |  |
| NOT UTILIZED |  |  | ○ |  | ○ |
| DIAGNOSTIC RESULT | 0.7 | 0.8 | — | 0.3 | — |
| COMPREHENSIVE ABNORMALITY DIAGNOSTIC RESULT | 0.6 | | | | |

FIG. 11

| DATE | TRAIN NUMBER | REPLACEMENT COMPONENT | REASON OF REPLACEMENT |
|---|---|---|---|
| 2015/1/1 | 1234A | BRAKE LINING | FRICTION FAILURE |
| 2015/1/2 | 5678B | BRAKE SHOW | FRICTION FAILURE |
| 2015/1/3 | 9012C | BRAKE LINING | FAILURE |

MAINTENANCE DATA

| DATE | TRAIN NUMBER | DRIVER NAME | REPORT CONTENT |
|---|---|---|---|
| 2014/12/29 | 1234A | TARO TOSHIBA | HARD TO APPLY BRAKE |
| 2014/12/30 | 5678B | HANAKO TOSHIBA | HARDER TO STOP THAN USUAL |
| 2014/12/31 | 9012C | GOSUKE TOSHIBA | DIFFERENT FROM USUAL |

ABNORMALITY REPORT DATA

ABNORMALITY DIAGNOSTIC DEVICE AND METHOD THEREFOR

CROSS-REFERENCE TO RELATED APPLICATIONS

This application is based upon and claims the benefit of priority from Japanese Patent Application No. 2015-246483, filed on Dec. 17, 2015; the entire contents of which are incorporated herein by reference.

FIELD

Embodiments described herein relate to an abnormality diagnostic device and a method therefor.

BACKGROUND

For safe operation of a railroad vehicle, an abnormality diagnostic device that diagnoses abnormality of the railroad vehicle is used. As such an abnormality diagnostic device, one that diagnoses abnormality of a railroad vehicle based on sensor data acquired from a sensor loaded on the railroad vehicle and a diagnostic model in which a relation between the sensor data and presence/absence of the abnormality is made into a model is known.

In a conventional abnormality diagnostic device, abnormality is diagnosed by applying arbitrary sensor data to a diagnostic model. However, in such a conventional abnormality diagnostic device, it is difficult to accurately diagnose abnormality of a railroad vehicle. This is because the sensor data of the railroad vehicle is in a dynamic and mutual dependence relation with conditions such as a time period, a traveling position, weather and the number of passengers.

For example, the performance of a brake of a railroad vehicle has different characteristics in the case that the railroad vehicle is traveling through a flat section and in the case that the railroad vehicle is traveling through an inclined section. Even when the sensor data is applied to the diagnostic model without distinguishing these conditions, it is difficult to accurately diagnose abnormality of the brake.

BRIEF DESCRIPTION OF THE DRAWINGS

FIG. 2 is a diagram illustrating one example of vehicle data;

FIG. 3 is a diagram illustrating one example of a learning object setter;

FIG. 4 is a diagram illustrating one example of a learning condition setter;

FIG. 8 is a diagram illustrating one example of data selection conditions stored in a selection condition DB;

FIG. 9 is a diagram illustrating one example of a diagnostic content setter;

FIG. 10 is a diagram illustrating one example of a diagnostic result of abnormality of a railroad vehicle;

FIG. 11 is a diagram illustrating another example of a diagnostic result of abnormality of a railroad vehicle;

FIG. 17 is a diagram illustrating one example of maintenance data; and

FIG. 18 is a diagram illustrating one example of abnormality report data.

DETAILED DESCRIPTION

According to one embodiment, an abnormality diagnostic device includes processing circuitry. The processing circuitry learns, based on a model generated from sensor data of a diagnostic object in a railroad vehicle, a data selection condition to select the sensor data to be utilized in a diagnosis of the diagnostic object. The processing circuitry diagnoses abnormality of the diagnostic object based on the sensor data satisfying the data selection condition and a diagnostic model relating the sensor data to the abnormality of the diagnostic object.

Hereinafter, embodiments of the present invention will be described with reference to drawings.

First Embodiment

Figure 1:
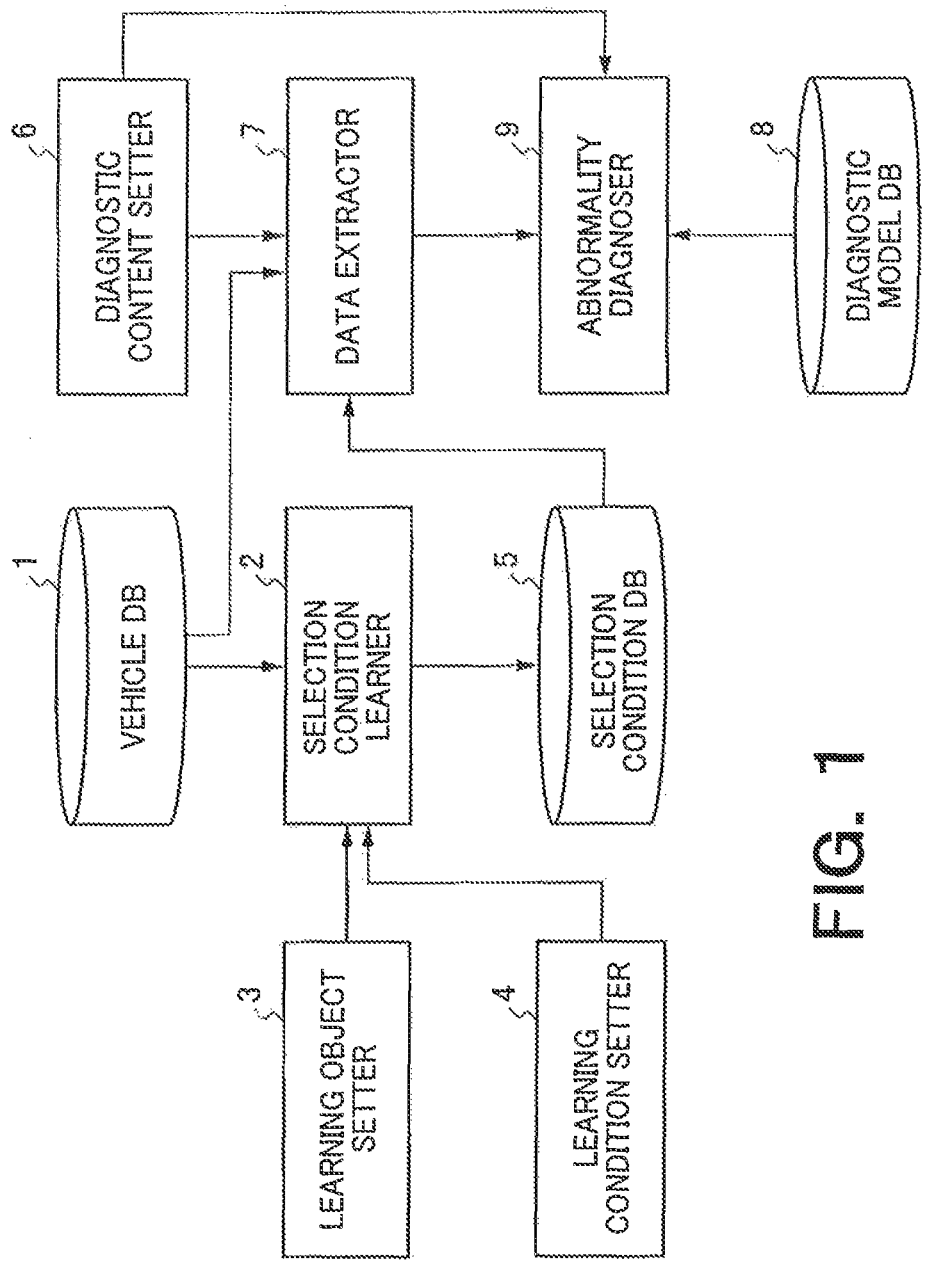
FIG. 1 is a diagram illustrating one example of a functional configuration of an abnormality diagnostic device relating to a first embodiment.

First, a functional configuration of an abnormality diagnostic device (hereinafter, referred to as "diagnostic device") relating to the first embodiment will be described with reference to FIG. 1 to FIG. 11. FIG. 1 is a diagram illustrating one example of the functional configuration of the diagnostic device relating to the present embodiment.

The diagnostic device in FIG. 1 includes a vehicle DB (database) 1, a selection condition learner 2, a learning object setter 3, a learning condition setter 4, a selection condition DB 5, a diagnostic content setter 6, a data extractor 7, a diagnostic model DB 8, and an abnormality diagnoser 9.

The vehicle DB 1 stores vehicle data of one or more railroad vehicles. The railroad vehicle here refers to a train in which one or more vehicles are connected. Each railroad vehicle includes one or more sensors that measure a state of each device provided in the railroad vehicle.

The device provided in the railroad vehicle is, for example, at least one of a main motor, an inverter, a static type inverter, an overhead wire, a pantograph, a wheel, a brake lining, a brake shoe, an air conditioner, and a door, but is not limited thereto.

The sensor measures a voltage, a current, a temperature, an acceleration speed, a speed, a position, and a pressure or the like, for example, as the state of the device. As the sensor that measures these states, an existing arbitrary sensor is utilized. In addition, the sensor may output a control value (for example, a brake notch or a power notch or the like) of the device, as the state of the device. The sensor may acquire the control value from a control signal of a master controller of the railroad vehicle. Hereinafter, data of the measured value (for example, a voltage value or the like) outputted by the sensor is referred to as sensor data.

The sensor data of the railroad vehicle is transmitted to a device outside the railroad vehicle through a wired or wireless communication network by a communication device provided in the railroad vehicle. The sensor data transmitted in such a manner is stored in the vehicle DB 1 as vehicle data. Though not shown in the FIG. 1, the diagnostic device relating to the present embodiment may include a communication device for receiving the sensor data transmitted from the railroad vehicle.

In addition, the diagnostic device may be connected with another device that receives the sensor data transmitted from the railroad vehicle directly or indirectly through the communication network and may receive input of the sensor data from the another device.

The vehicle data is time-sequential data including one or more pieces of the sensor data. The vehicle data of a certain railroad vehicle includes the sensor data outputted by the sensor loaded on the railroad vehicle.

FIG. 2 is a diagram illustrating one example of the vehicle data stored in the vehicle DB 1. In the example in FIG. 2, each sensor data is made to correspond to each measurement date and time thereof. Hereinafter, the vehicle data for each measurement date and time is referred to as a record. Each record corresponds to each row in FIG. 2. The record of the vehicle data in FIG. 2 includes values of the date and time, a train number, a position, a vehicle occupancy (or vehicle occupancy rate), a speed, a brake notch, a power notch, a regeneration amount, and an overhead wire voltage, respectively.

The date and time are the measurement date and time by the sensor. The train number is an intrinsic identifier (ID) of the railroad vehicle. The position indicates a traveling position of the railroad vehicle. The position may be expressed by a section on a route, may be expressed by a distance from a predetermined spot (for example, a station or the like) on the route, or may be expressed by latitude and longitude. The vehicle occupancy is an amount corresponding to the number of passengers in the railroad vehicle. The vehicle occupancy may be expressed by a percentage to total weight of the passengers to be a reference, may be expressed by the total weight of the passengers, or may be expressed by the number of passengers calculated from the total weight of the passengers. The speed is a speed of the railroad vehicle. The brake notch is a control value of a brake handle. The power notch is a control value of a handle of the master controller. The regeneration amount is an amount corresponding to regeneration power by a regeneration brake provided in the railroad vehicle. The regeneration amount can be expressed by an arbitrary unit such as a current, a voltage, electrical power, power, and energy or the like. The overhead wire voltage is a voltage of the overhead wire that supplies power to the railroad vehicle, and corresponds to a voltage of the pantograph of the railroad vehicle.

Note that the vehicle data in FIG. 2 is merely one example, and the vehicle data may include the other sensor data. In addition, the vehicle data may include statistical sensor data in which granularity of the sensor data is made rough. Thus, a data amount of the sensor data can be suppressed, and a capacity demanded for the vehicle DB 1 and a communication speed demanded for the diagnostic device or the like can be lowered.

The selection condition learner 2 (referred to as "learner 2", hereinafter) learns data selection conditions of the sensor data (referred to as "object data", hereinafter) utilized for diagnosing abnormality of a diagnostic object (the device of the railroad vehicle). Here, an outline of the learner 2 will be described. Note that, below, it is assumed that the diagnostic object and the object data are made to correspond to each other beforehand.

For example, in the case that the diagnostic object is a brake of the railroad vehicle, as the object data, a deceleration speed or the like stored in the vehicle DB 1 is utilized. However, there is a possibility that the deceleration speed (object data) stored in the vehicle DB 1 includes the one not suitable for diagnosing the abnormality of the brake. For example, the deceleration speed while the railroad vehicle is climbing an uphill and the deceleration speed during congestion of the railroad vehicle are different from the deceleration speed during normal time in characteristics, and are not suitable for diagnosing the abnormality of the brake. When such a deceleration speed is utilized, there is a risk that the abnormality of the brake cannot be accurately diagnosed.

Therefore, in order to improve diagnostic accuracy, it is important that the diagnostic device selectively utilizes the object data advantageous for diagnosing the diagnostic object from the object data stored in the vehicle DB 1. Then, the learner 2 learns the data selection conditions for selecting the advantageous object data from the object data stored in the vehicle DB 1. In the above-described example, for example, the fact that the railroad vehicle is traveling on a flatland and the fact that the vehicle occupancy of the railroad vehicle is equal to or lower than a predetermined value are the data selection conditions.

Specifically, the learner 2 learns the data selection conditions based on the object data, a learning item and the granularity thereof, the vehicle data stored in the vehicle DB 1, and a learning condition.

The learning item is an arbitrary parameter that can divide the vehicle data. The learning item is, for example, at least one of a time range (a time period, a day of the week, a month and a season or the like), the sensor data (the vehicle occupancy and the position (the latitude and longitude or the section) or the like), an environmental factor (weather, an air temperature and humidity or the like), a vehicle classification number in the railroad vehicle, and an operation pattern of the railroad vehicle or the like, but is not limited thereto.

The learning item has a plurality of values that can divide the vehicle data. For example, in the case that the learning item is the time period, 24 time periods from 0 o'clock (0:00-0:59) to 23 o'clock (23:00-23:59) are the values of the learning item. In this example, each value of the time period has a time width of one hour, however, the time width can be arbitrarily set according to the granularity. In addition, for example, in the case that the learning item is the weather, discrete values of fine weather, rainy weather and cloudy weather or the like are the values of the learning item.

First, the learner 2 divides the vehicle data for each value of the learning item. In the case that the learning item is the time period, the learner 2 divides the vehicle data into each time period of the measurement date and time, for example. In the above-described example, the vehicle data stored in the vehicle DB 1 is divided into 24 pieces of the vehicle data from the vehicle data of 0 o'clock to the vehicle data of 23 o'clock. In such a manner, in the case that the learning item is included in the vehicle data, the learner 2 can divide the vehicle data by referring to the vehicle DB 1.

In addition, in the case that the learning item is not included in the vehicle data, the diagnostic device may include a learning item DB storing history data and setting information relating to the learning item, separate from the vehicle DB 1. For example, in the case that the learning item is the weather and the weather is not included in the vehicle data, the diagnostic device may include a weather DB storing the history data of the weather. In this case, the learner 2 may refer to the weather DB, acquire the date and time corresponding to each value (the fine weather, the rainy weather and the cloudy weather or the like) of the weather, and divide the vehicle data for each acquired date and time. Thus, the vehicle data can be divided for each value of the learning item.

Next, the learner 2 generates a learning model for each divided vehicle data. The learning model is a regression model with the object data as an objective variable and the other sensor data as an explanatory variable. The other sensor data can be arbitrarily selected according to the object data. The learning model is a linear regression model but is not limited thereto.

Subsequently, the learner 2 compares the learning models corresponding to the individual values of the learning item and the learning condition. The learning condition is a condition of a feature amount of a model generated based on the sensor data. In the present embodiment, the learning condition corresponds to the condition of the feature amount of the learning model, and is set by a determination coefficient, a correlation coefficient, and a residual of the learning model, for example. The residual here is an error of a theoretical value of the learning model and a measured value. The learner 2 learns the value of the learning item for which the learning model satisfying the learning condition is generated, as the data selection condition.

Note that the learning item for which the learner 2 learns the data selection condition for one piece of the object data may be one or more. In addition, for each learning item, the plurality of values may be learned as the data selection conditions.

The learning object setter 3 is configured by a CUI (character user interface) or a GUI (graphical user interface) or the like, and allows the object data for which the learner 2 learns the data selection conditions, the learning item and the granularity thereof to be set by a user. The object data, the learning item and the granularity thereof set by the user are utilized by the learner 2.

For example, the learning object setter 3 displays one or more object data candidates and learning item candidates set beforehand. The user selects the object data and the learning item from the displayed object data candidates and learning item candidates. One or more learning items can be selected for one piece of the object data.

FIG. 3 is a diagram illustrating one example of the learning object setter 3 configured by the GUI. In the example in FIG. 3, the overhead wire voltage is selected as the object data. The object data candidates are displayed by a pulldown menu, for example.

In addition, in the example in FIG. 3, as learning item candidates, the position, the time period, the vehicle occupancy, and the weather are listed and displayed. Learning propriety in FIG. 3 indicates a selection result by the user, and learning granularity indicates the granularity of each learning item set by the user. A unit of the granularity of the learning item can be arbitrarily set according to a kind of the learning item. The unit of the granularity of the learning item may be selectable by the user.

In the example in FIG. 3, as the learning item, the position and the time period are selected. The granularity of the position is set at 1, and the granularity of the time period is set at 2. The unit of the granularity of the position is, for example, one section. In this case, the learner 2 divides the vehicle data stored in the vehicle DB 1 by one section each. In addition, the unit of the granularity of the time period is, for example, one hour. In this case, since the granularity of the time period is set at 2, the learner 2 divides the vehicle data stored in the vehicle DB 1 by two hours each.

Note that the diagnostic device may not include the learning object setter 3. In this case, the object data, the learning item and the granularity thereof may be preset to the learner 2.

The learning condition setter 4 is configured by the CUI or the GUI, and allows the learning condition of the learner 2 to be set by the user. The learning condition set by the user is utilized by the learner 2.

The learning condition setter 4 may display one or more learning condition candidates set beforehand, or may allow the value of the parameter (the determination coefficient or the like) to be utilized as the learning condition to be inputted by the user.

FIG. 4 is a diagram illustrating one example of the learning condition setter 4 configured by the GUI. In the example in FIG. 4, the learning condition is set by the determination coefficient of the learning model, and the value (setting value) can be inputted by the user. In the example in FIG. 4, the fact that the determination coefficient of the learning model is 0.8 or larger is the learning condition. Therefore, the learner 2 learns the value of the learning item for which the learning model with the determination coefficient of 0.8 or larger is generated, as the data selection condition.

Figures 5, 6:
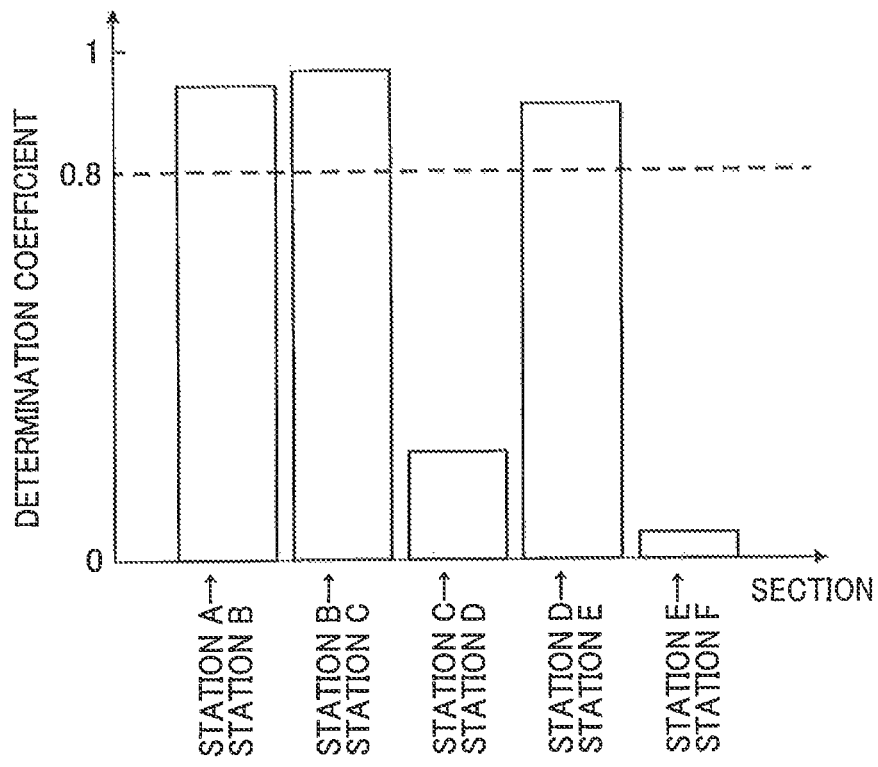
FIG. 5 is a diagram explaining one example of a learning method of data selection conditions.
FIG. 6 is a diagram illustrating another example of the learning condition setter.

FIG. 5 is a diagram explaining such a learning method. A horizontal axis in FIG. 5 is the learning item (section), and a vertical axis is the determination coefficient of the learning model generated for each section. Hereinafter, a section from a station X to a station Y is referred to as a section XY.

In the example in FIG. 5, since the determination coefficient of the learning model generated based on the vehicle data of a section AB (the section from a station A to a station B) is 0.8 or larger, the learner 2 learns the section AB as the data selection condition. It is similar for a section BC and a section DE.

FIG. 6 is a diagram illustrating another example of the learning condition setter 4 configured by the GUI. In the example in FIG. 6, the learning condition is set by the residual and a ratio thereof, and the value (setting value) can be inputted by the user. In the example in FIG. 6, the fact that a part where the residual is 0.8 or larger is 20% or less to the entire learning model is the learning condition. Therefore, the learner 2 learns the value of the learning item for which the learning model with the part where the residual is 0.8 or larger being 20% or less is generated, as the data selection condition.

Figure 7:
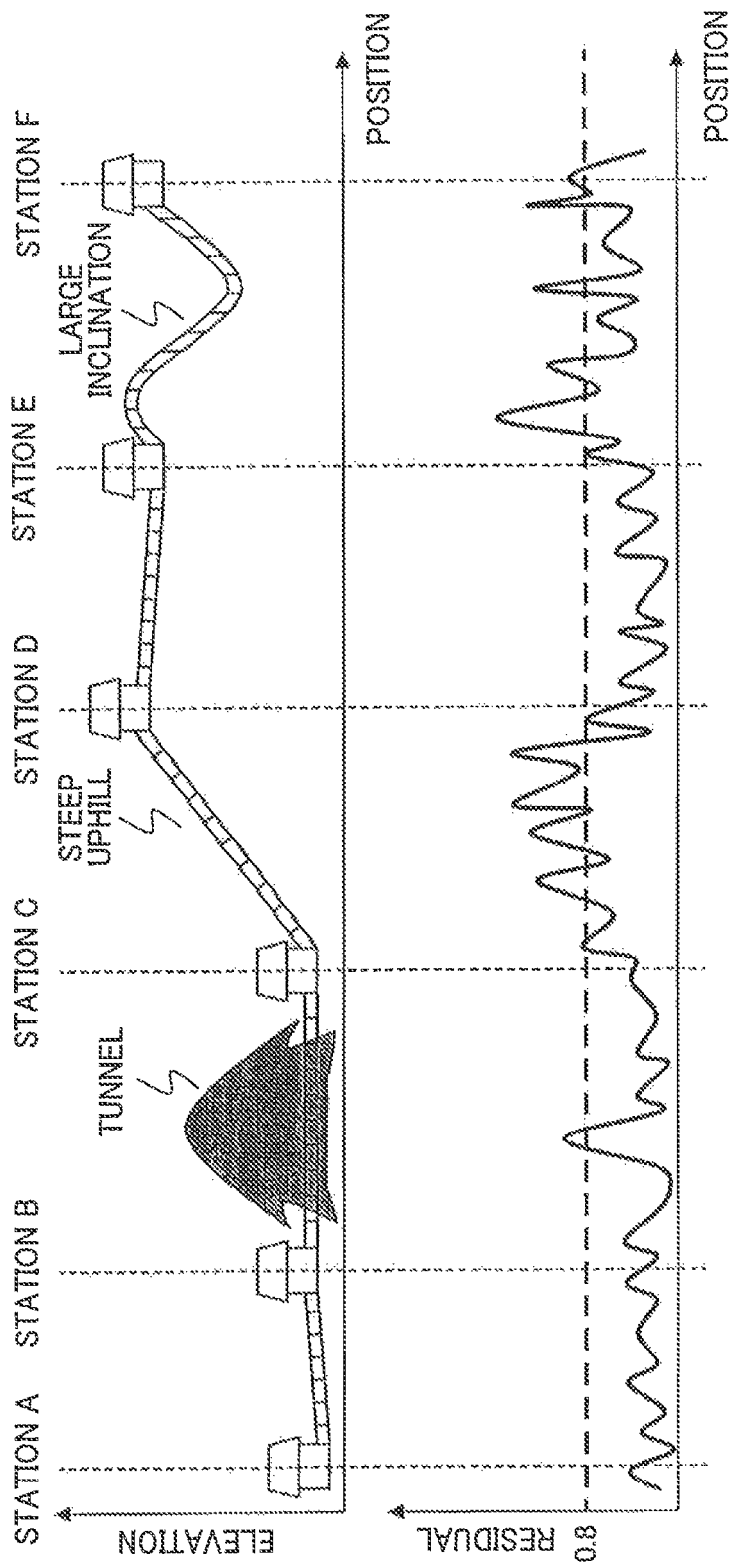
FIG. 7 is a diagram explaining another example of the learning method of data selection conditions.

FIG. 7 is a diagram explaining such a learning method. A vertical axis of an upper graph in FIG. 7 is an elevation of the route, a vertical axis of a lower graph is the residual at each position of the learning model for each section, and a horizontal axis of both graphs is the position. In FIG. 7, the learning item is the section. In the example in FIG. 7, since the part where the residual is 0.8 or larger in the section AB is 20% or less, the learner 2 learns the section AB as the data selection condition. It is similar for the section BC and the section DE.

Note that the diagnostic device may not include the learning condition setter 4. In this case, the learning condition may be preset to the learner 2.

The selection condition DB 5 stores the data selection conditions learned by the learner 2 for each object data. FIG. 8 is a diagram illustrating one example of the data selection conditions learned for certain object data, which are stored in the selection condition DB 5. In the example in FIG. 8, for the object data, the data selection condition of the section, and the learning condition of the time period are stored. In FIG. 8, "utilized" Indicates that it is the data selection condition, and "not utilized" indicates that it is not the data selection condition.

In the example in FIG. 8, the data selection conditions of the section are the section AB, the section BC, and the section DE. In addition, in the example in FIG. 8, the data selection conditions of the time period are the time period of 5:00 to 7:00, the time period of 11:00 to 13:00, and the time period of 13:00 to 15:00.

The diagnostic content setter 6 is configured by the CUI or the GUI, and allows diagnostic content by the abnormality diagnoser 9 to be set by the user. The diagnostic content includes an ID of the diagnostic object (the ID of the railroad vehicle or the ID of the device) and a diagnostic period. The diagnostic period is a period of the measurement date and time of the object data to be utilized for a diagnosis. The diagnostic content set by the user is utilized by the abnormality diagnoser 9.

The diagnostic content setter 6 may display one or more diagnostic object candidates set beforehand, and may allow the ID of the diagnostic object to be inputted by the user.

In addition, the diagnostic content setter 6 may allow the data selection conditions of the object data corresponding to the diagnostic object set by the user to be changed by the user. Specifically, when the diagnostic object is inputted by the user, the diagnostic content setter 6 acquires the data selection conditions of the object data corresponding to the diagnostic object from the selection condition DB 5, and displays the acquired data selection conditions. By changing the displayed data selection conditions, the user can freely set the data selection conditions.

FIG. 9 is a diagram illustrating one example of the diagnostic content setter 6 configured by the GUI. In the example in FIG. 9, as the data selection conditions of the object data, the data selection conditions of the section and the data selection conditions of the time period are displayed. The data selection conditions are similar to that in FIG. 8 and are acquired from the selection condition DB 5. In the example in FIG. 9, the user can change the data selection conditions by an operation of a cursor (an arrow in FIG. 9).

In such a manner, by making the data selection conditions variable, a degree of freedom of the diagnosis can be improved. For example, in the example in FIG. 9, while three sections (the section AB, the section BC and the section DE) are displayed as the data selection conditions of the section, it can be considered to reduce the sections to be utilized as the data selection conditions to one or two. By reducing the data selection conditions, a data amount of the vehicle data utilized for the diagnosis is reduced, and the time needed for the diagnosis can be shortened.

The data extractor 7 (referred to as "extractor 7", hereinafter) extracts the vehicle data according to the diagnostic content set by the user from the vehicle DB 1. First, the extractor 7 acquires the data selection conditions of the object data corresponding to the diagnostic object from the selection condition DB 5. Next, the extractor 7 extracts the vehicle data of the diagnostic period satisfying the acquired data selection conditions from the vehicle DB 1. At the time, the extractor 7 may extract the entire vehicle data, may extract a part of the vehicle data including the object data, or may extract only the object data.

Here, case that the diagnostic object is a brake of a railroad vehicle X, the object data is the deceleration speed, and the data selection conditions are the three sections indicated in FIG. 8 is considered. In this case, the extractor 7 refers to the vehicle DB 1, and extracts at least a part of the vehicle data, including the deceleration speed during traveling through the three sections which are the data selection conditions, from the deceleration speed of the railroad vehicle X stored in the vehicle DB 1.

The diagnostic model DB 8 stores a diagnostic model for diagnosing the abnormality of the diagnostic object based on the object data. For the diagnostic model, a relation between the sensor data and the presence/absence or degree of the abnormality of the diagnostic object is made into a model. The diagnostic model of each diagnostic object is stored in the diagnostic model DB 8 beforehand. A variable of the diagnostic model may be the object data only, or may be a plurality of kinds of the sensor data including the object data.

As the diagnostic model, for example, the one that compares statistics (an average value, a maximum value, a minimum value, and a standard deviation or the like) of the object data and a predetermined threshold, and outputs a diagnostic result according to a comparison result can be considered. An example of such a diagnostic model is the one that diagnoses the diagnostic object as being abnormal in the case that the average value of the object data is a threshold or larger (or smaller).

In addition, the diagnostic model may be the one that compares the parameter calculated from the plurality of pieces of the sensor data including the object data and the predetermined threshold, and outputs the diagnostic result according to the comparison result. Further, the diagnostic model may be the one that outputs a value indicating the degree of the abnormality (or normality) of the diagnostic object, according to the above-described statistics or parameter.

The abnormality diagnoser 9 (referred to as "diagnose 9", hereinafter) diagnoses the abnormality of the diagnostic object based on the vehicle data extracted by the extractor 7 and the diagnostic model and outputs the diagnostic result. The diagnostic result outputted by the diagnoser 9 may be two values of the abnormality and normality, or may be the value indicating the degree of the abnormality (or the normality). In addition, the diagnoser 9 may output one diagnostic result from the entire vehicle data extracted by the extractor 7, or may output the diagnostic results for each data selection condition and output a comprehensive diagnostic result based on the diagnostic results for each data selection condition.

FIG. 10 is a diagram illustrating one example of the diagnostic result outputted by the diagnoser 9. In the example in FIG. 10, the diagnoser 9 outputs the diagnostic results for each data selection condition and the comprehensive diagnostic result (comprehensive abnormality diagnostic result) based on the diagnostic results for each data selection condition. The diagnostic result is expressed by the two values of the abnormality or the normality.

The diagnostic result for each data selection condition is outputted based on the vehicle data satisfying the data selection condition, which is extracted by the extractor 7, and the diagnostic model. For example, the diagnostic result of the section AB is outputted based on the vehicle data of the section AB and the diagnostic model. It is similar for the section BC and the section DE. In the example in FIG. 10, the diagnostic result of the section AB is the abnormality, and the diagnostic results of the section BC and the section DE are the normality.

A determination method of the comprehensive diagnostic result is arbitrary. The comprehensive diagnostic result may be determined by majority decision of the diagnostic results for each data selection condition, for example, or the abnormality may be determined in the case that at least one of the diagnostic results for each data selection condition is the abnormality, as in the example in FIG. 10.

FIG. 11 is a diagram illustrating another example of the diagnostic result outputted by the diagnoser 9. In the example in FIG. 11, differently from FIG. 10, the diagnostic result is expressed by the value indicating the degree of the abnormality. The diagnostic result of the section AB is 0.7, the diagnostic result of the section BC is 0.8, the diagnostic result of the section DE is 0.3, and the comprehensive diagnostic result is 0.6. In the example in FIG. 11, as the comprehensive diagnostic result, an average value of the diagnostic results for each data selection condition is outputted.

Note that a diagnostic result output method by the diagnoser 9 is not limited to the examples in FIG. 10 and FIG. 11. The diagnoser 9 may use a two-value diagnostic result and the value indicating the degree of the abnormality (or the normality) together. An example of such a diagnostic result output method is a method of outputting, together with the value indicating the degree of the abnormality (or the normality), the two-value diagnostic result according to the value.

Figure 12:
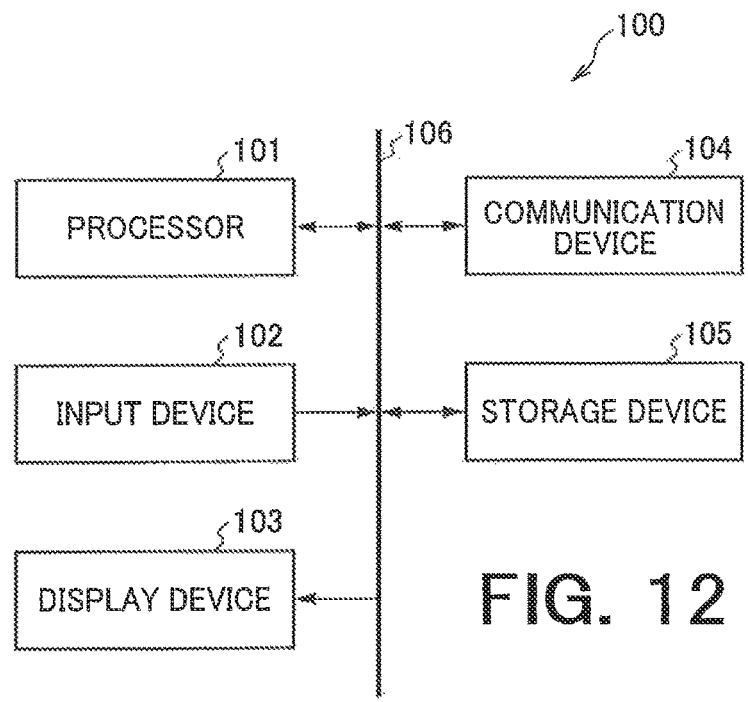
FIG. 12 is a diagram illustrating one example of a hardware configuration of the abnormality diagnostic device.

Next, a hardware configuration of the diagnostic device relating to the present embodiment will be described with reference to FIG. 12. The diagnostic device relating to the present embodiment is configured by a computer 100. For the computer 100, a server, a client, a microcomputer, and a general purpose computer or the like are included. FIG. 12 is a diagram illustrating one example of the computer 100.

The computer 100 in FIG. 12 includes a CPU (Central Processing Unit) 101, an input device 102, a display device 103, a communication device 104, and a storage device 105. The processor 101, the input device 102, the display device 103, the communication device 104, and the storage device 105 are connected with each other by a bus 106.

The processor 101 is processing circuitry or an electronic circuit including a controller and an arithmetic unit of the computer 100. As the processor 101, for example, a general purpose processor, a central processing unit (CPU), a microprocessor, a digital signal processor (DSP), a controller, a microcontroller, a state machine, an application specific integrated circuit, a field programmable gate array (FPGA), a programmable logic device (PLD), and a combination thereof can be used.

The processor 101 performs arithmetic processing based on data and programs inputted from the individual devices (for example, the input device 102, the communication device 104, and the storage device 105) connected through the bus 106, and outputs arithmetic results and control signals to the individual devices (for example, the display device 103, the communication device 104, and the storage device 105) connected through the bus 106. Specifically, the processor 101 executes an OS (operating system) of the computer 100 and an abnormality diagnostic program or the like, and controls the individual devices configuring the computer 100.

The abnormality diagnostic program is a program that makes the computer 100 achieve the above-described individual functional configurations of the diagnostic device. The abnormality diagnostic program is stored in a non-transitory tangible computer-readable storage medium. The above-described storage medium is, for example, an optical disk, a magneto-optical disk, a magnetic disk, a magnetic tape, a flash memory, and a semiconductor memory, but is not limited thereto. By execution of the abnormality diagnostic program by the processor 101, the computer 100 functions as the diagnostic device.

The input device 102 is a device for inputting information to the computer 100. The input device 102 is, for example, a keyboard, a mouse, and a touch panel, but is not limited thereto. The user can perform various kinds of setting through the learning object setter 3, the learning condition setter 4, and the diagnostic content setter 6 by using the input device 102.

The display device 103 is a device for displaying images and video images. The display device 103 is, for example, an LCD (liquid crystal display), a CRT (cathode-ray tube), and a PDP (plasma display panel), but is not limited thereto. The display device 103 displays the GUI or the CUI configuring the learning object setter 3, the learning condition setter 4, and the diagnostic content setter 6 or the like. In addition, the display device 103 may display various kinds of data stored in the vehicle DB 1, the selection condition DB 5, and the diagnostic model DB 8, and the diagnostic results as in FIG. 10 and FIG. 11 outputted by the diagnoser 9.

The communication device 104 is a device for the computer 100 to perform wireless or wired communication with an external device. The communication device 104 is, for example, a modem, a hub and a router, but is not limited thereto. The vehicle data is inputted from the external device (for example, the communication device loaded on the railroad vehicle) through the communication device 104, and stored in the vehicle DB 1.

The storage device 105 is a hardware storage or a storage medium that stores the OS of the computer 100, the abnormality diagnostic program, data needed for execution of the abnormality diagnostic program, and data generated by the execution of the abnormality diagnostic program or the like. For the storage device 105, a main storage and an external storage are included. The main storage is, for example, a RAM, a DRAM and an SRAM, but is not limited thereto. In addition, the external storage is, for example, a hard disk, an optical disk, a flash memory and a magnetic tape, but is not limited thereto. The vehicle DB 1, the selection condition DB 5, and the diagnostic model DB 8 may be constructed on the storage device 105, or may be constructed on an external server.

Note that the computer 100 may include one or more each of the processor 101, the input device 102, the display device 103, the communication device 104 and the storage device 105, or a peripheral device such as a printer or a scanner may be connected thereto.

In addition, the diagnostic device may be configured by a single computer 100, or may be configured as a system formed of the plurality of computers 100 connected to each other.

Further, the abnormality diagnostic program may be stored beforehand in the storage device 105 of the computer 100, may be stored in a storage medium outside the computer 100, or may be uploaded on the Internet. In any case, functions of the diagnostic device are achieved by installing the abnormality diagnostic program to the computer 100 and executing it.

Figure 13:
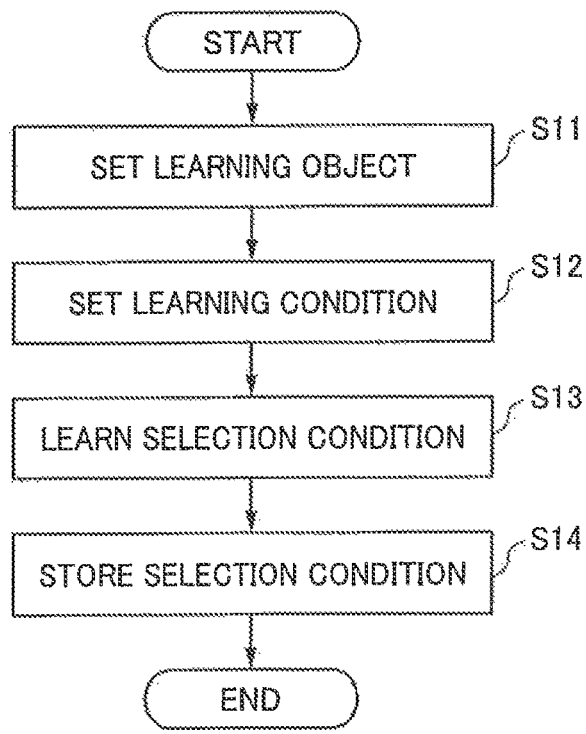
FIG. 13 is a flowchart illustrating one example of learning processing of data selection conditions.
Figure 14:
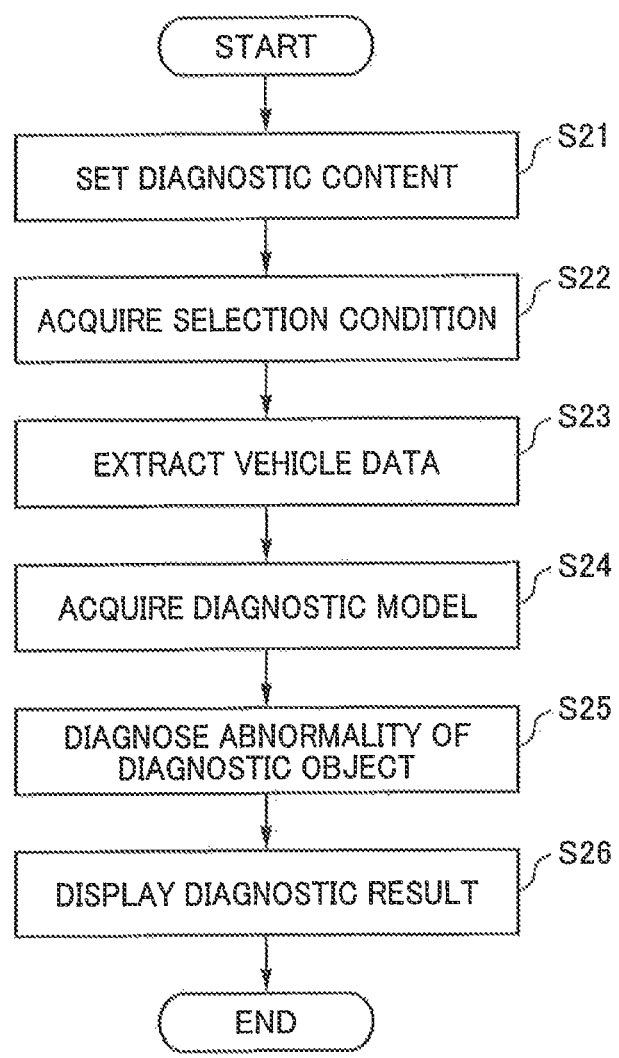
FIG. 14 is a flowchart illustrating one example of abnormality diagnostic processing.

Next, an operation of the diagnostic device relating to the present embodiment will be described with reference to FIG. 13 to FIG. 15. First, learning processing of the data selection condition by the diagnostic device will be described with reference to FIG. 13. FIG. 13 is a flowchart illustrating the learning processing of the data selection condition.

First, the diagnostic device displays the learning object setter 3 at the display device 103. The user inputs the object data, the learning item and the granularity thereof, using the input device 102. Thus, the object data, the learning item and the granularity thereof to be utilized by the learner 2 are set (step S11).

Next, the diagnostic device displays the learning condition setter 4 at the display device 103. The user inputs the learning condition using the input device 102. Thus, the learning condition to be utilized by the learner 2 is set (step S12).

Note that steps S11 and S12 may be in reverse order. In addition, the Learning object setter 3 and the Learning condition setter 4 may be displayed in the same window, or may be displayed in different windows respectively.

Subsequently, the learner 2 learns the data selection conditions based on the set object data, the learning item and the granularity thereof, the learning condition, and the vehicle data (step S13). Specifically, the learner 2 acquires the vehicle data from the vehicle DB 1, and divides the acquired vehicle data for each value of the learning item. Next, the learner 2 generates the learning model for each divided vehicle data. Then, the learner 2 learns the value of the learning item for which the learning model satisfying the learning condition is generated as the data selection condition of the object data.

Thereafter, the learner 2 inputs the learned data selection condition to the selection condition DB 5. The selection condition DB 5 stores the inputted data selection condition as the data selection condition of the object data (step S14).

Note that, in the above description, the diagnostic device learns the data selection condition based on the object data and the learning item set by the user. However, the object data and the learning item may be set to the learner 2 beforehand. In this case, the learner 2 may learn the data selection condition based on the set object data and learning item and update the learned data selection condition at a predetermined time interval.

Next, abnormality diagnostic processing of the diagnostic object by the diagnostic device will be described with reference to FIG. 14 and FIG. 15. FIG. 14 is a flowchart illustrating the abnormality diagnostic processing.

First, the diagnostic device displays the diagnostic content setter 6 at the display device 103. The user inputs the ID of the diagnostic object and the diagnostic period using the input device 102. Thus, the diagnostic object and the diagnostic period for which the diagnoser 9 is to diagnose the abnormality are set (step S21).

Next, the extractor 7 acquires the data selection condition of the object data corresponding to the diagnostic object from the selection condition DB 5 (step S22). The data selection condition acquired here is the data selection condition learned in the above-described learning processing.

Subsequently, the data extractor 7 extracts the vehicle data of the diagnostic period satisfying the data selection condition from the vehicle DB 1 (step S23). The extracted vehicle data includes the object data. The extractor 7 inputs the extracted vehicle data to the diagnoser 9.

Next, the diagnoser 9 acquires the diagnostic model for diagnosing the abnormality of the diagnostic object from the diagnostic model DB 8 (step S24).

Then, the diagnoser 9 diagnoses the abnormality of the diagnostic object based on the vehicle data inputted from the extractor 7 and the diagnostic model, and outputs the diagnostic result (step S25).

Thereafter, the display device 103 displays the diagnostic result outputted by the diagnoser 9 (step S26). FIG. 15 is a diagram illustrating one example of a diagnostic result screen displayed by the display device 103.

Figure 15:
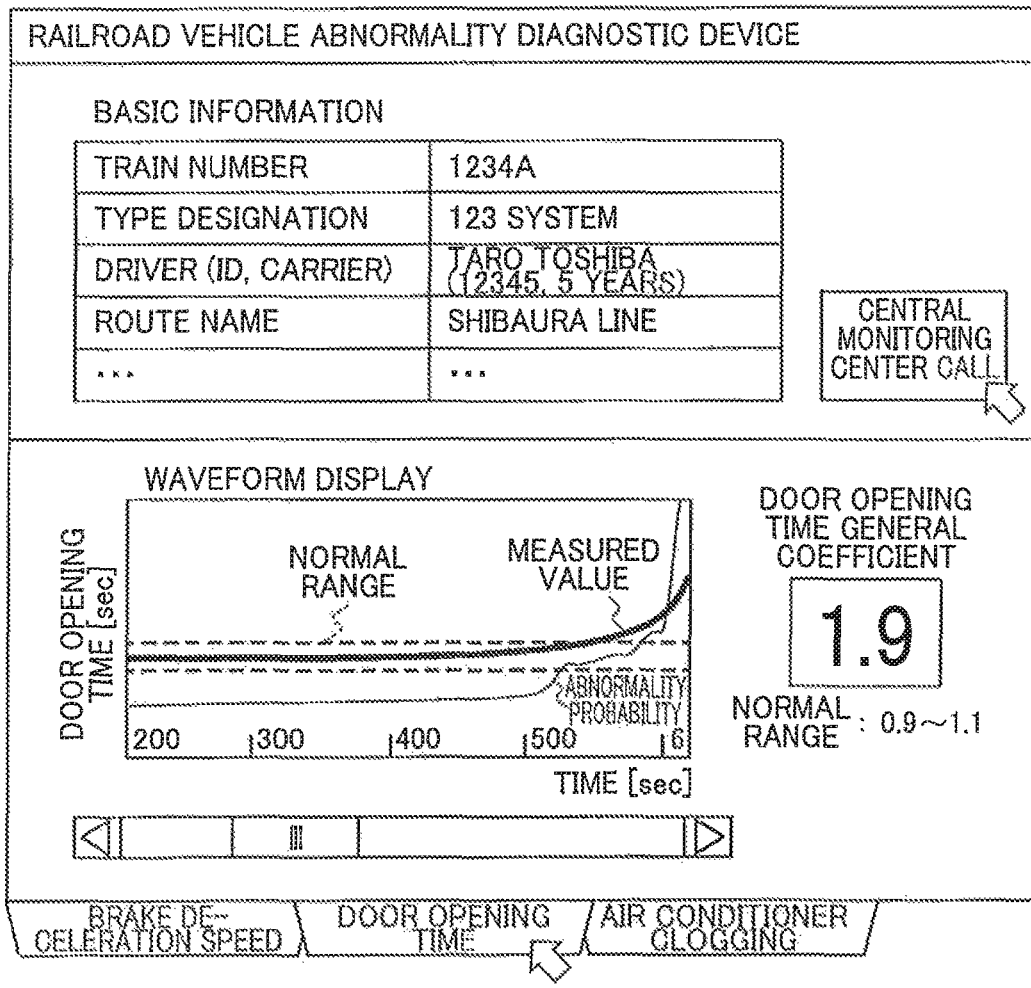
FIG. 15 is a diagram illustrating one example of a diagnostic result screen that displays a diagnostic result.

On the diagnostic result screen in FIG. 15, basic information of the diagnostic object and the diagnostic result are displayed. In the example in FIG. 15, as the basic information, the ID (train number) of the railroad vehicle, a type designation, a driver, and a route name or the like are displayed. In addition, together with the basic information, a call button (central monitoring center call) is displayed. The user of the diagnostic device can communicate with a central monitoring center by operating the input device 102 and pressing the call button.

In addition, on the diagnostic result screen in FIG. 15, as the diagnostic result, the history data of the measured value of the object data (door opening time) stored in the vehicle DB 1, a current value (door opening time general coefficient) of the object data, a normal range of the object data, and the value (abnormality probability) indicating the degree of the abnormality of the diagnostic object are displayed. The current value of the object data corresponds to a value at a right end of the graph of the measured value of the object data.

In the example in FIG. 15, the normal range of the door opening time is 0.9 to 1.1, and the current value is 1.9. In addition, the abnormality probability at present (the right end of the graph) is at a high level. The user who looks at the diagnostic result screen can easily recognize that the abnormality is occurring at the door of a train number 1234A.

On the diagnostic result screen in FIG. 15, the devices (the brake, the door and the air conditioner) for which the diagnostic result is displayed can be switched by a tab. The user can confirm the diagnostic result of a desired device by switching the tab.

As described above, the diagnostic device relating to the present embodiment learns the data selection condition for selecting the object data advantageous for diagnosing the diagnostic object based on the vehicle data stored in the vehicle DB 1, and diagnoses the abnormality of the diagnostic object based on the object data satisfying the learned data selection condition. Thus, the diagnostic device can accurately diagnose the abnormality of the railroad vehicle.

Note that, while the case that the diagnostic device is configured by a server installed in the central monitoring center of the railroad vehicle or the like is assumed and described above, the configuration of the diagnostic device is not limited thereto. For example, the diagnostic device may be partially configured by the server installed in the central monitoring center, and may be partially configured by clients loaded in each railroad vehicle.

In this case, the vehicle DB 1, the learner 2, the learning object setter 3, the learning condition setter 4 and the selection condition DB 5 may be configured by the server installed in the central monitoring center, and the diagnostic content setter 6, the extractor 7, the diagnostic model DB 8, and diagnoser 9 may be configured by the clients loaded in each railroad vehicle.

By such a configuration, the driver of each railroad vehicle can diagnose the abnormality of the railroad vehicle driven by himself/herself on the spot by operating the diagnostic content setter 6 configured by the client. The client may acquire a selection condition from the selection condition DB 5 configured on the server of the central monitoring center through a wired or wireless communication network, or the selection condition DB 5 may be configured on the client beforehand.

Second Embodiment

A diagnostic device relating to the second embodiment will be described with reference to FIG. 16 to FIG. 18. The diagnostic device relating to the first embodiment utilizes the learning model and learns the data selection condition. In contrast, the diagnostic device relating to the present embodiment utilizes abnormality data and learns the data selection condition.

Figure 16:
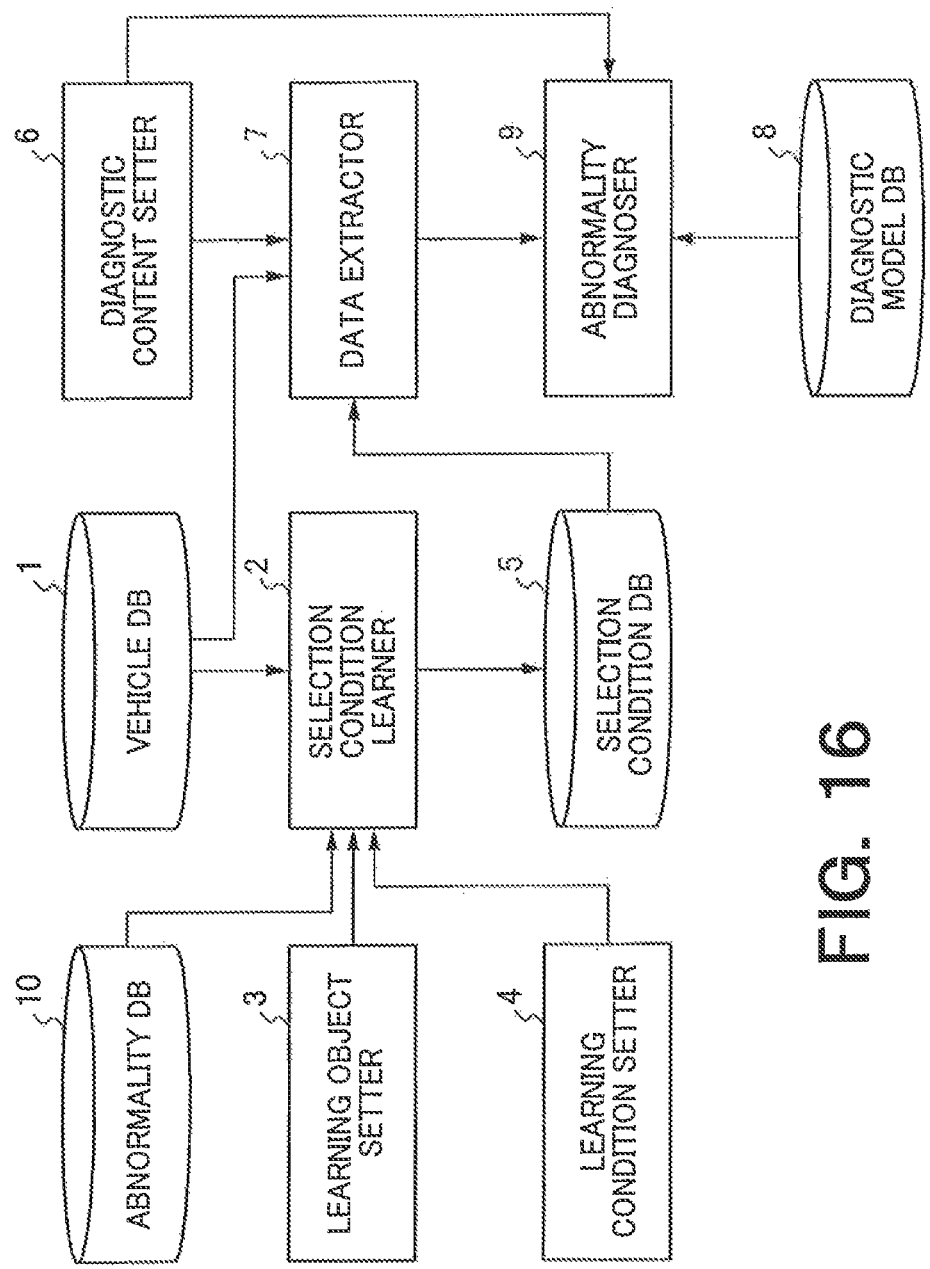
FIG. 16 is a diagram illustrating one example of a functional configuration of an abnormality diagnostic device relating to a second embodiment.

FIG. 16 is a diagram illustrating one example of the functional configuration of the diagnostic device relating to the present embodiment. The diagnostic device in FIG. 16 includes an abnormality DB 10. The other configuration is similar to the first embodiment.

The abnormality DB 10 stores abnormality data. The abnormality data is the history data relating to the abnormality of the railroad vehicle. The abnormality data includes maintenance data and abnormality report data.

The maintenance data is the history data relating to maintenance work of the railroad vehicle. The maintenance data includes data such as the content and date of the maintenance work.

FIG. 17 is a diagram illustrating one example of the maintenance data. In the example in FIG. 17, the maintenance data includes the date of the maintenance work, the ID (train number) of the railroad vehicle for which the maintenance work is performed, a replacement component, and a reason of replacement. For example, according to the record of the first row in FIG. 17, a brake lining of the railroad vehicle having the train number 1234A was replaced due to a friction failure on Jan. 1, 2015.

The maintenance data like FIG. 17 corresponds to the history data of the abnormality actually generated in the device of the railroad vehicle. The maintenance data is, for example, inputted by a worker of the maintenance work, and is stored in the abnormality DB 10.

The abnormality report data is the history data of a report relating to the abnormality made by the driver of the railroad vehicle. The abnormality report data includes data such as the content and date of the report.

FIG. 18 is a diagram illustrating one example of the abnormality report data. In the example in FIG. 18, the abnormality report data includes the date of the report, the ID (train number) of the railroad vehicle for which the abnormality is reported, a name of the driver who makes the report, and report content. For example, according to the record of the first row in FIG. 18, on Dec. 29, 2014, for the railroad vehicle having the train number 1234A, the driver named Taro Toshiba reported the content that it was hard to apply a brake.

The abnormality report data like FIG. 18 corresponds to the history data of the abnormality with a high possibility of being generated in the device of the railroad vehicle. The abnormality report data is, for example, inputted by the driver of the railroad vehicle and stored in the abnormality DB 10.

In the present embodiment, the learner 2 learns the data selection condition for selecting the advantageous object data, using the above-described abnormality data stored in the abnormality DB 10. Specifically, the learner 2 acquires the vehicle data from the vehicle DB 1, and divides the acquired vehicle data by each value of the learning item. At the time, the vehicle data corresponding to each record of the abnormality data is excluded from the vehicle data. For example, in the example in FIG. 17, the vehicle data of the railroad vehicle having the train number 1234A on Jan. 1, 2015, the vehicle data of the railroad vehicle having the train number 5678B on Jan. 2, 2015, and the vehicle data of the railroad vehicle having the train number 9012C on Jan. 3, 2015 are excluded.

Next, the learner 2 generates the learning model based on each divided vehicle data, and detects the abnormality corresponding to each record of the abnormality data based on the generated learning model and the vehicle data corresponding to each record of the abnormality data.

Then, the learner 2 learns the value of the learning item with a high accuracy rate of the detected abnormality as the data selection condition. At the time, the learner 2 may learn the value of the learning item with the highest accuracy rate as the data selection condition, or may learn the value of the learning item with the accuracy rate being a predetermined value or higher as the data selection condition. The conditions to be learned as the data selection condition may be preset as the learning condition, or may be set by the user through the learning object setter 3.

As described above, the diagnostic device relating to the present embodiment learns the data selection condition for selecting the advantageous object data such that the accuracy rate for the abnormality data becomes high. Thus, the diagnostic device can accurately diagnose the abnormality of the railroad vehicle.

Note that, in abnormality detection based on the learning model, the learner 2 may utilize the entire abnormality data as correct answer data, or may utilize a part of the abnormality data as the correct answer data. In the case of utilizing partial abnormality data as the correct answer data, the abnormality data to be utilized as the correct answer data may be selected by applying a method of text mining or the like to the description content.

In addition, the learner 2 may learn the data selection condition by using the learning method relating to the present embodiment and the learning method relating to the first embodiment together.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An abnormality diagnostic device comprising:
a vehicle database configured to store a plurality of pieces of sensor data of a diagnostic object in a railroad vehicle; and
processing circuitry configured to:
divide the plurality of pieces of sensor data according to values of a learning item to obtain a plurality of sets of sensor data,
generate a plurality of models each associating a first variable assigned first sensor data with a second variable assigned second sensor data, based on the sets of sensor data,
calculate feature amounts of the models based on first sensor data of each set and the models,
select at least one value from the values of the learning item based on the feature amounts to obtain a data selection condition based on the selected at least one value,
extract first sensor data satisfying the data selection condition from the vehicle database, and
diagnose abnormality of the diagnostic object based on the extracted first sensor data and a diagnostic model representing a relation between first sensor data and abnormality of the diagnostic object.

2. The abnormality diagnostic device according to claim 1, wherein:
the learning item is at least one of a time range, sensor data, an environmental factor, a vehicle classification number in the railroad vehicle, and an operation pattern of the railroad vehicle, and
the data selection condition is a condition based on the at least one of a time range, sensor data, an environmental factor, a vehicle classification number in the railroad vehicle, and an operation pattern of the railroad vehicle.

3. The abnormality diagnostic device according to claim 2, wherein the time range includes at least one of a time period, a day of the week, a month and a season, the sensor data includes at least one of a vehicle occupancy, latitude and longitude, and a section on a route, and the environmental factor includes at least one of weather, an air temperature and humidity.

4. The abnormality diagnostic device according to claim 1, wherein the model is a regression model relating first sensor data to second sensor data.

5. The abnormality diagnostic device according to claim 1, wherein the feature amount is at least one of a determination coefficient, a correlation coefficient, and a residual of the model.

6. The abnormality diagnostic device according to claim 1, wherein the processing circuitry generates a plurality of the data selection conditions, and diagnoses abnormality of the diagnostic object for each of data selection conditions.

7. The abnormality diagnostic device according to claim 6, wherein the processing circuitry outputs a comprehensive diagnostic result based on diagnostic results for the data selection conditions.

8. The abnormality diagnostic device according to claim 1, wherein the processing circuitry learns the data selection condition so that an accuracy rate for history data relating to abnormality of the railroad vehicle becomes high.

9. The abnormality diagnostic device according to claim 1, wherein the processing circuitry selects a value of the learning item for which the feature amount satisfies a learning condition.

10. An abnormality diagnostic method comprising:
providing a vehicle database configured to store a plurality of pieces of sensor data of a diagnostic object in a railroad vehicle;
dividing the plurality of pieces of sensor data according to values of a learning item to obtain a plurality of sets of sensor data;
generating a plurality of models each associating a first variable assigned first sensor data with a second variable assigned second sensor data, based on the sets of sensor data;
calculating feature amounts of the models based on first sensor data of each set and the models;
selecting at least one value from the values of the learning item based on the feature amounts to obtain a data selection condition based on the selected at least one value;
extracting first sensor data satisfying the data selection condition from the vehicle database; and
diagnosing abnormality of the diagnostic object based on the extracted first sensor data and a diagnostic model representing a relation between first sensor data and abnormality of the diagnostic object.

* * * * *